United States Patent
Yanai et al.

(10) Patent No.: US 7,551,280 B2
(45) Date of Patent: Jun. 23, 2009

(54) METHOD FOR MANUFACTURING OPTICAL ELEMENT, METHOD FOR MANUFACTURING PROJECTOR, OPTICAL ELEMENT AND PROJECTOR

(75) Inventors: Hiroaki Yanai, Shiojiri (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 347 days.

(21) Appl. No.: 11/677,248

(22) Filed: Feb. 21, 2007

(65) Prior Publication Data
US 2007/0199645 A1    Aug. 30, 2007

(30) Foreign Application Priority Data
Feb. 27, 2006    (JP)    .............. 2006-049738

(51) Int. Cl.
  *G01J 3/447*    (2006.01)
  *G01J 4/00*    (2006.01)
  *G02F 1/1335*    (2006.01)
(52) U.S. Cl. .............. 356/364; 356/319; 356/322; 349/5; 349/8; 359/483; 359/486
(58) Field of Classification Search ......... 356/364–369, 356/319, 322, 326; 349/5, 8, 119, 96; 359/831, 359/486, 483
See application file for complete search history.

(56) References Cited

U.S. PATENT DOCUMENTS 6,885,465 B2 *    4/2005    Kitabayashi et al.    ........ 356/614

FOREIGN PATENT DOCUMENTS

| JP | A 7-020317 | 1/1995 |
| JP | A 2000-112022 | 4/2000 |

* cited by examiner

*Primary Examiner*—L. G Lauchman
(74) *Attorney, Agent, or Firm*—Oliff & Berridge, PLC

(57) ABSTRACT

A method for manufacturing an optical element in which a display quality of a projection image is improved is provided. The method is for manufacturing an optical element having a polarization plate of which one side a transmissive member is bonded. The method includes preparing a light source, a polarization plate, a transmissive member, a certificating polarization plate and a spectrophotometer; arranging the polarization plate, the transmissive member, and the certificating polarization plate between the light source and the spectrophotometer; measuring a light transmittance spectrum of a predetermined wavelength at each rotational position of the transmissive member; determining the rotational position of the transmissive member that yields a smallest value for a difference between a maximum value and a minim value of the light transmittance spectrum; and bonding the transmissive member to the polarization plate at the determined rotational position.

6 Claims, 9 Drawing Sheets

POLARIZATION AXIS OF LIGHT-INCIDENT SIDE POLARIZATION PLATE 420R

OPTIC AXIS OF TRANSMISSIVE MEMBER 430R

POLARIZATION AXIS OF CERTIFICATING POLARIZATION PLATE 720

POLARIZATION AXIS OF LIGHT-INCIDENT SIDE POLARIZATION PLATE 420R

OPTIC AXIS OF TRANSMISSIVE MEMBER 430R

POLARIZATION AXIS OF CERTIFICATING POLARIZATION PLATE 720

METHOD FOR MANUFACTURING OPTICAL ELEMENT, METHOD FOR MANUFACTURING PROJECTOR, OPTICAL ELEMENT AND PROJECTOR

BACKGROUND

1. Technical Field

The present invention relates to a method for manufacturing an optical element, a method for manufacturing a projector, an optical element and a projector.

2. Related Art

In a projector having a liquid crystal device as an optically modulating device, a polarization plate is disposed in at least one of a light-incident side and a light-emission side of the liquid crystal device. The polarization plate that is a two or three-layered lamination, having a polarization layer comprising polyvinyl alcohol (PVA) and at least one supporting layers comprising triacetyl cellulose (TAC) laminated in one side or both sides of the PVA for purpose of enhancing mechanical strength thereof is a well-known example of the polarization plate (see JP-A-7-20317). The supporting layer comprising TAC is excellent in transparency, uniformity and planarity and has very little anisotropic. Accordingly, the supporting layer comprising TAC is widely used for a supporting layer in order to support the polarization layer.

Meanwhile, in a projector of a related art, a light that does not pass through the polarization plate gives rise to an increase in temperature of the polarization plate because the light is absorbed in the polarization plate to generate a considerable amount of heat. Consequently, the projector of the related art has some disadvantages such that a display quality of a projection image is lowered. For example, the polarization characteristics of the polarization plate are deteriorated, the contrast of the projection image is lowered, and an uneven contrast or an uneven color is generated.

Therefore, a projector having an optical element comprising a light transmissive member having a thermal conductivity that is adhered to both sides of the polarization plate (namely, outer surface of the supporting layer of the polarization plate) is provided in order to solve the problem of the projector of the related art (see JP-A-2000-112022). In the projector, the heat generated in the polarization plate is emitted outside of the projector through the light transmissive member having a thermal conductivity so that the increase of the temperature of the polarization plate may be avoided. Therefore, the deterioration of the polarization plate may be prevented and accordingly, the polarization characteristic of the polarization plate may not be lowered. Accordingly, a projector having the optical element may enhance the display quality of the projection image.

Meanwhile, recently, the demand for a projector for use in electric home appliances having a projector, such as a home theater system is increased. Consequently, it is more required for the projector to have an improved quality of the projection image. However, in a projector of a related art, which uses a material having an optical axis as a light transmissive member having a thermal conductivity, the polarization state of a light which passes through the light transmissive member and is incident on the polarization plate or the polarization state of a light which passes through the polarization plate and is incident on the light transmissive member may be varied if an optical axis of the light transmissive member and a polarization axis of the polarization plate do not have a desired positional relationship therebetween. Accordingly, the contrast of the projection image may be decreased, and the temperature of the polarization plate may be increased so that the display quality of the projection image is lowered. In addition, in the projector of the related art, an incident side polarization plate is disposed on a light-incident side of the liquid crystal device and an emission side polarization plate is disposed on a light-emission side of the liquid crystal device, in order that the incident side polarization plate and the emission side polarization plate are in a so-called crossed Nicols state. Herein, if the incident side polarization plate and the emission side polarization plate are not placed in an optimal rotational position, the contrast of the projection image may be decreased, or the temperature of the emission side polarization plate may be increased so that the display quality of the projection image is lowered.

SUMMARY

An advantage of some aspects of the invention is to provide a method for manufacturing an optical element and a method for manufacturing a projector where the display quality of the projection image can be improved. Another advantage of some aspects of the invention is to provide an optical element and a projector manufactured according to the methods.

The invention is based on an idea that if a polarization plate and a light transmissive member are adhered to each other in an optimal rotation position, then the display quality of a projection image is increased. Also, the idea that if the polarization plate on the light-incident side and the polarization plate on the light-emission side are positioned in the optimal rotation position, then the quality of the projection image is increased inspired the invention.

According to an aspect of the invention, there is provided a method for manufacturing an optical element having a light transmissive member having an optical axis thereof, and a polarization plate having at least a polarization layer, in which the light transmissive member is bonded to one side of the polarization plate used to manufacture an optical element. The method includes: preparing a light source, the polarization plate, the light transmissive member, a certificating polarization plate and a spectrophotometer; arranging the light transmissive member between the polarization plate and the certificating polarization plate so that the polarization plate and the certificating polarization plate are in a crossed Nicols state, and the polarization plate, the light transmissive member and the certificating polarization plate are arranged between the light source and the spectrophotometer in an order such that a light from the light source is incident on the polarization plate, passes through the polarization plate, the light transmissive member and the certificating polarization plate, and is incident on the spectrophotometer, or in an order such that a light from the light source is incident on the certificating polarization plate, passes through the certification polarization plate, the light transmissive member and the polarization plate, and is incident on the spectrophotometer; measuring a light transmittance spectrum with respect to each rotational position of the light transmissive member within a predetermined wavelength of light incident on the spectrophotometer while the light transmissive member is rotated relative to an axis that is parallel to a central axis of a light transmitting the light transmissive member; determining a rotational position of the light transmissive member based on a measured result of the light transmittance spectrum measured in the measuring of the light transmittance spectrum such that yields a smallest value for a difference between a minimum value and a maximum value of the light transmittance spectrum; and bonding the light transmissive member to the polarization plate at the rotational position of the light transmissive member that is determined in the determining the rotational position.

Therefore, in the method according to the aspect of the invention, the light transmissive member is rotated and a light transmittance spectrum of a light is measured with respect to each rotational position. Based on the measured result of the light transmittance spectrum with respect to each rotational position, the rotational position of the light transmissive member is determined such that yields the smallest value for the difference between a minimum value and a maximum value of the light transmittance spectrum. The polarization plate and the light transmissive member are bonded at the determined relative rotational position so that the polarization axis of the polarization plate may be adjusted to be parallel to or orthogonal to the optical axis of the light transmissive member with higher precision. Accordingly, the variation of the polarization state of a light when transmitting the optical element may be prevented or reduced. As a result, the degradation of display quality of a projection image may be prevented or reduced.

Therefore, in the method according to the aspect of the invention, it is possible to manufacture an optical element having an improved display quality of projection image.

According to another aspect of the invention, there is provided a method for manufacturing an optical element having a second light transmissive member bonded to a second surface opposing to a first surface of the polarization plate where the light transmissive member is bonded. The method includes: preparing the second light transmissive member; second arranging the second light transmissive member between the polarization plate and the certificating polarization plate so that the to polarization plate and the certificating polarization plate are in a crossed Nicols state, and the polarization plate, the second light transmissive member and the certificating polarization plate are arranged between the light source and the spectrophotometer in an order such that a light from the light source is incident on the polarization plate, passes through the polarization plate, the second light transmissive member and the certificating polarization plate, and is incident on the spectrophotometer, or in an order such that a light from the light source is incident on the certificating polarization plate, passes through the certificating polarization plate, the second light transmissive member and the polarization plate, and is incident on the spectrophotometer; second measuring a light transmittance spectrum with respect to each rotational position of the second light transmissive member within a predetermined wavelength of light incident on the spectrophotometer while the second light transmissive member is rotated relative to an axis that is parallel to a central axis of a light transmitting the second light transmissive member; second determining a rotational position of the second light transmissive member based on a measured result of the light transmittance spectrum measured in the measuring of the second light transmittance spectrum such that yields a smallest value for a difference between a minimum value and a maximum value of the second light transmittance spectrum; and second bonding the second light transmissive member to the polarization plate at the rotational position of the second light transmissive member that is determined in the determining of the second rotational position.

Thus when the polarization plate that is bonded to the light transmissive member and the second light transmissive member are bonded together, similar to a case where the light transmissive member is bonded to the polarization plate, the second light transmissive member is rotated and a light transmittance spectrum of a light is measured with respect to each rotational position. Based on the measured result of the light transmittance spectrum with respect to each rotational position, the rotational position of the second light transmissive member is determined such that yields the smallest value for the difference between a minimum value and a maximum value of the light transmittance spectrum. The polarization plate and the second light transmissive member are bonded at the determined relative rotational position so that the polarization axis of the polarization plate may be adjusted to be parallel to or orthogonal to the optical axis of the second light transmissive member with higher precision. Accordingly, the variation of the polarization state of a light when transmitting the optical element may be prevented or reduced. As a result, the degradation of display quality of a projection image may be prevented or reduced.

Therefore, in the method for manufacturing an optical element according to another aspect of the invention, it is possible to manufacture an optical element having an improved display quality of projection image.

In the method for manufacturing an optical element, a polarization axis of the polarization plate and an optical axis of the light transmissive member, or the polarization axis of the polarization plate and an optical axis of the second light transmissive member may be adjusted with a precision level equal to or less than 0.5 degree. The precision level equal to or less than 0.5 degree is a precision level that is not easily achieved when measuring a light transmittance in the measuring of the light transmittance using a light of a single wavelength or in the measuring of the light transmittance using a light of a wideband wavelength as it is.

In the method for manufacturing an optical element, at least one of the light transmissive member and the second light transmissive member may use, for example, a light transmissive substrate comprising sapphire or quartz.

In the method for manufacturing an optical element, the light transmissive member and the polarization plate, or the second light transmissive member and the polarization plate are bonded together using a pressure sensitive adhesive. Alternatively, the light transmissive member and the polarization plate, or the second light transmissive member and the polarization plate may be bonded together using an adhesive. Herein, a UV curable adhesive or a visible ray short wavelength curable adhesive may be used as the adhesive.

According to another aspect of the invention, there is provided a method for manufacturing a projector having a light source device for emitting a luminous flux, a liquid crystal device for modulating the luminous flux emitted from the light source according to image information, a projecting optical system for projecting a light modulated by the liquid crystal device, an incident side polarization plate having at least polarization layer, arranged on a light-incident side of the liquid crystal device and an emission side polarization plate having at least polarization layer, arranged on a light-emission side of the liquid crystal device. Here, the method includes: arranging the polarization plate in which the incident side polarization plate and the emission side polarization plate are respectively arranged on the light-incident side and the light-emission side of the liquid crystal device proper polarization relationship therebetween; and arranging a spectrophotometer on the light-emission side of the liquid crystal device prior to performing the arranging of the polarization plate. The arranging of the polarization plate includes a first process in which the incident side polarization plate and the emission side polarization plate are in a crossed Nicols state, and the incident side polarization plate, the liquid crystal device and the emission side polarization plate are disposed in an order such that a light emitted from the light source passes through the incident side polarization plate, the liquid crystal device and the emission side polarization plate and is incident on the spectrophotometer; a second process in which at least one of the incident side polarization plate and the emission side polarization plate is rotated relative to an axis parallel to a central axis of a light transmitting the liquid crystal device to vary an angle between a polarization axis of the incident side polarization plate and a polarization axis of the emission side polarization plate, and a light transmittance spectrum of a light, that is incident on the spectrophotometer in a predetermined wavelength, is measured at respective rotational position; a third process in which a relative rotational position for the incident side polarization plate and the emission side polarization plate is determined based on a measured result of the light transmittance spectrum at respective rotational position, the relative rotational positions providing a smallest value for a difference between a maximum value and a minimum value of the light transmittance spectrum; and a fourth process in which the incident side polarization plate and the emission side polarization plate are fixed to maintain the relative rotational position for the incident side polarization plate and the emission side polarization plate.

Therefore, in the method for manufacturing a projector according to the aspect of the invention, at least one of the polarization plate on a light-incident side and the polarization plate on a light-emission side is rotated and a light transmittance spectrum with respect to respective rotational position is measured. Based on the measured result of the light transmittance spectrum, relative rotational positions of the polarization plate on the light-incident side and the polarization plate on the light-emission side are determined such that yields the smallest value for the difference between a minimum value and a maximum value of the light transmittance spectrum. The polarization plate on the light-incident side and the polarization plate on the light-emission side are bonded at the determined relative rotational position so that it is prevented or reduced that a light that is to pass through the polarization plate on the light-emission side is absorbed by the polarization plate, or a light that is to be absorbed by the polarization plate on the light-emission side passes through the polarization plate. In addition, lowering in contrast of a projection image, an uneven brightness, or an uneven color may be prevented or reduced. As a result, the deterioration of display quality of a projection image may be prevented or reduced.

Therefore, in the method for manufacturing a projector according to the aspect of the invention, it is possible to manufacture a projector having improved display quality of a projection image.

In the method for manufacturing a projector according to the aspect of the invention, a polarization axis of a polarization plate on the light-incident side and a polarization axis of a polarization plate on the light-emission side may be adjusted with a precision level equal to or less than 0.5 degree. The precision level equal to or less than 0.5 degree is a precision level that is not easily achieved when measuring a light transmittance using a light of a single wavelength or in measuring transmittance using a light of a wideband wavelength as it is.

The method for manufacturing a projector according to further aspect of the invention may also be used to manufacture a projector having a plurality of liquid crystal devices.

According to another aspect of the invention, there is provided an optical element which is manufactured using the method for manufacturing an optical element of the aspect of the invention.

Therefore, the optical element according to the aspect of the invention has enhanced display quality of a projection image.

According to another aspect of the invention, there is provided a projector which is manufactured using the method for manufacturing a projector of the aspect of the invention.

Therefore, the projector according to the aspect of the invention has enhanced display quality of a projection image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings.

First Embodiment

First, a configuration of a projector according to a first embodiment will be described with reference to FIGS. 1 through 3.

Figure 1:
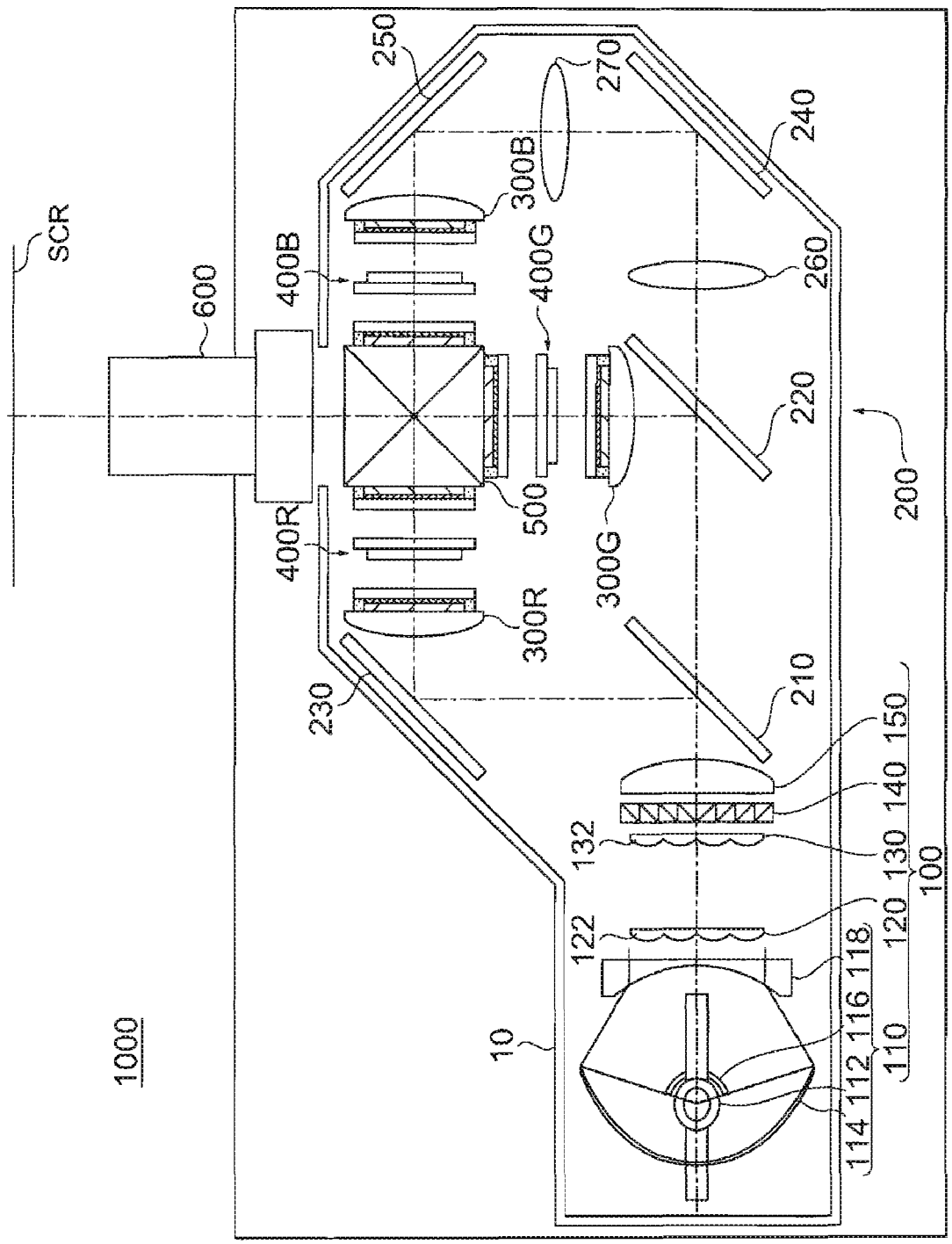
FIG. 1 illustrates an optical system of a projector according to a first embodiment.
Figure 2A:
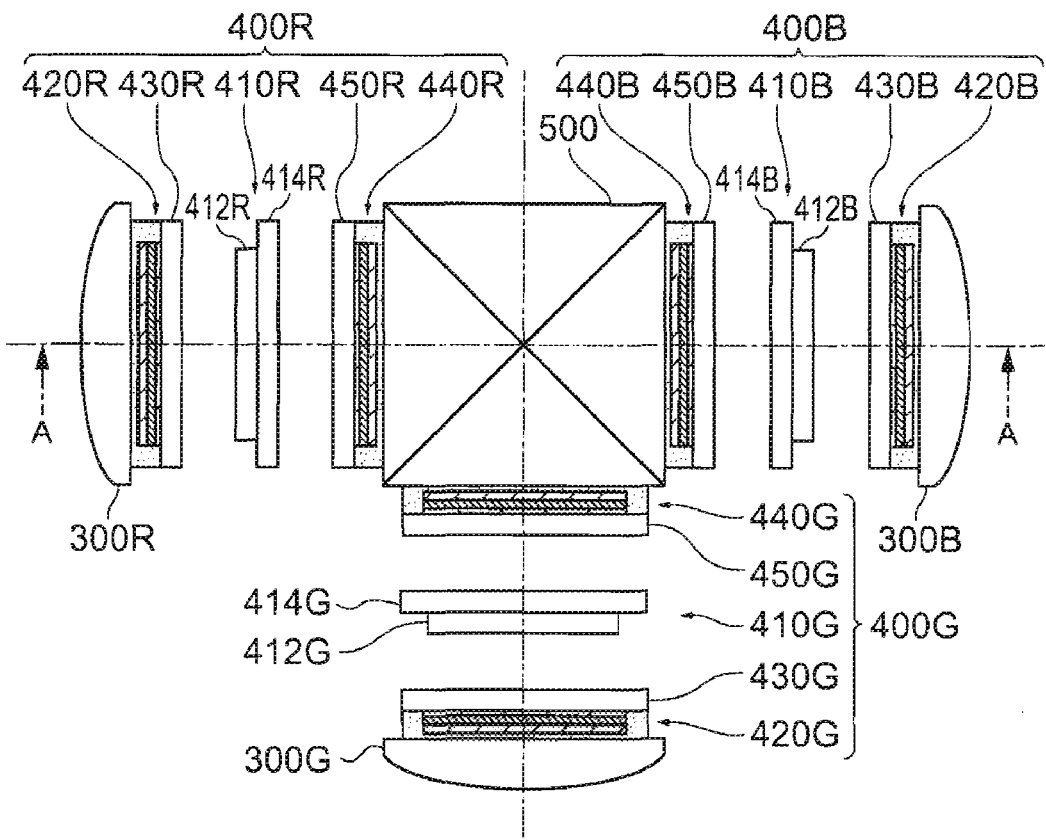
FIGS. 2A and 2B illustrate relevant portions of a projector according to the first embodiment.
Figure 2B:
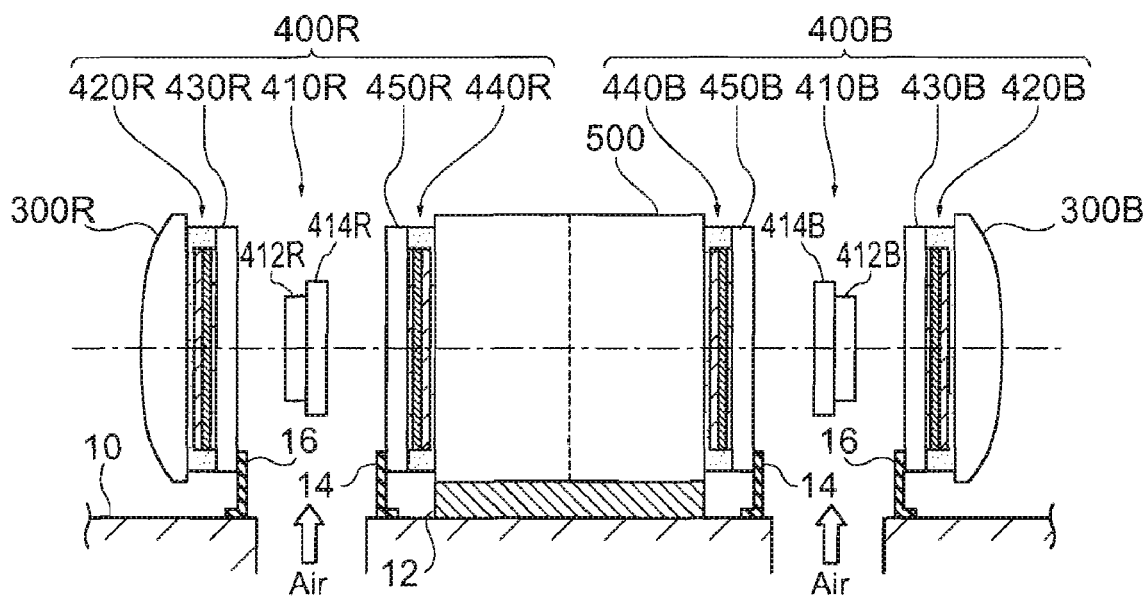
Figure 3A:
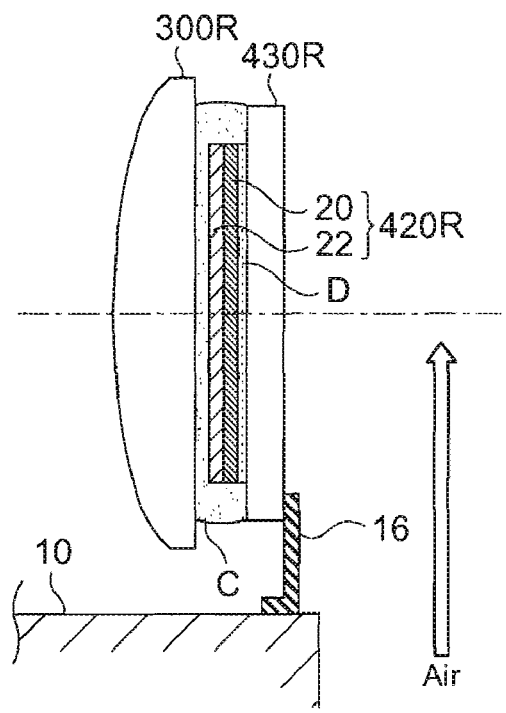
FIGS. 3A and 3B illustrate relevant portions of a projector according to the first embodiment.
Figure 3B:
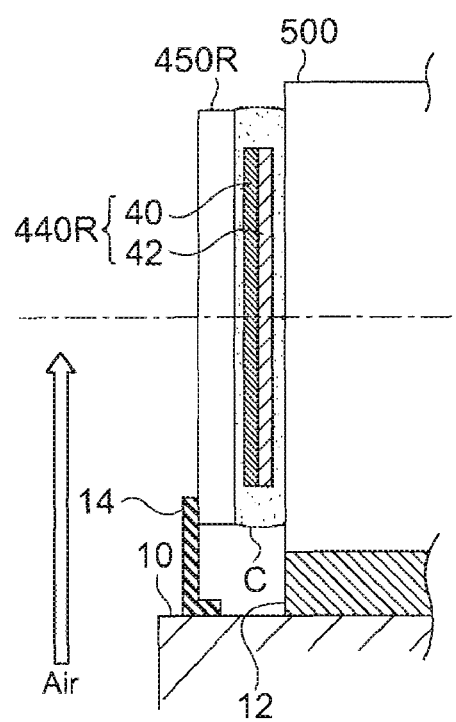

FIG. 1 illustrates an optical system of a projector 1000 according to a first embodiment. FIGS. 2 and 3 illustrate relevant portions of the projector 1000 according to the first embodiment. FIG. 2A is viewed from the top side of the projector 1000 and FIG. 2B is a cross-sectional view taken along the line A of FIG. 2A. FIG. 3A is viewed from the side of a light-incident side polarizing plate 420R, and FIG. 3B is viewed from the side of a light-emission side polarizing plate 440R.

The projector 1000 according to the first embodiment, as shown in FIG. 1, includes a lighting device 100, a color division light-guiding optical system 200 that divides a luminous flux received from the lighting device 100 into three color lights of a right color light, a green color light and a blue color light to emit the divided color lights to an illuminated area, three liquid crystal devices 410R, 410G and 410B that modulate three color lights produced by the color division light-guiding optical system 200, and a cross dichroic prism 500 that combines the color lights modulated by the liquid crystal devices 410R, 410G and 410B, and a projecting optical system 600 that projects the light combined by the cross dichroic prism 500 on a projection surface of a screen SCR. Each of the optical system is received by a case 10.

The lighting device 100 includes a light source device 110 that serves as a light source for emitting substantially parallel luminous fluxes to the illuminated area, a first lens array 120 having a first plurality of small lenses 122 that divides the luminous flux emitted from the light source device 110 into a partial luminous flux, a second lens array 130 having a second plurality of small lenses 132 corresponding to the first plurality of small lenses 122, a polarization converting element 140 that aligns the luminous flux emitted from the light source device 110, of which polarization direction is not aligned to approximately one straight polarized light, and a superposed lens 150 that superpose respective partial luminous flux emitted from the polarization converting element 140 on an illuminated area.

The light source device 110 includes an ellipsoid reflector 114 as a reflector, a luminary conduit 112 that emits a light near a first focus of the ellipsoid reflector 114, a subsidiary mirror 116 that has a reflection surface facing a concave surface of the ellipsoid reflector 114, and a concave lens 118 that converts a collected light that is reflected by the ellipsoid reflector 114 to a parallel light. The light source device 110 emits a luminous flux with an illumination optical axis $100ax$ as the central axis.

The luminary conduit 112 has an aperture, and a pair of encapsulation units that extend toward both sides of the aperture.

The ellipsoid reflector 114 has a tube-shaped image receiving unit that is passed through and fixed to one encapsulation unit of the luminary conduit 112, and a reflection concave surface that reflects a light radiated from the luminary conduit 112 toward a second focus.

The subsidiary mirror 116 is passed through and fixed to the other encapsulation unit of the luminary conduit 112, and is configured to face the ellipsoid reflector 114 when being inserted into the luminary conduit 112. Also, the subsidiary mirror 116 reflects a light, which is radiated from the luminary conduit 112 and is not directed to the ellipsoid reflector 114, back to the luminary conduit 112 so that the light may be incident on the ellipsoid reflector 114.

The concave lens 118 is positioned in the illuminated area of the ellipsoid reflector 114. In addition, the concave lens 118 is configured to adjust the light emitted from the ellipsoid reflector 114 to a parallel light.

The first lens array 120 functions as a luminous flux division optical element that divides a light emitted from the concave lens 118 into a plurality of partial luminous fluxes. The first lens array 120 includes the first plurality of small lenses 122 that are arranged in a matrix shape on a surface substantially orthogonal to the illumination optical axis $100ax$. Although not shown in the figure, the first plurality of small lenses 122 have an external shape that are similar to an external shape of an image forming area of the respective liquid crystal devices 410R, 410G and 410B.

The second lens array 130 is an optical element that collects the plurality of partial luminous fluxes that are divided by the first lens array 120. Similar to the first lens array 120, the second lens array 130 has a second plurality of lenses 132 that are arranged in a matrix shape on a surface substantially orthogonal to the illumination optical axis $100ax$.

The polarization converting element 140 adjusts the polarization direction of each partial luminous flux from the first lens array 120 to emit a straight polarized light of approximately one kind.

The polarization converting element 140 has a polarization separation layer, a reflection layer and a phase difference plate. The polarization separation layer penetrates a first straight polarization component among polarization components in the luminous flux received from the light source device 110 to reflect a second straight polarization component in a direction orthogonal to the illumination optical axis $100ax$. The reflection layer reflects the second straight polarization component reflected by the polarization separation layer in a direction parallel to the illumination optical axis $100ax$. The phase difference plate converts the second straight polarization component reflected by the polarization separation layer into the first straight polarization component.

The superposed lens 150 is used to collect the plurality of the partial luminous fluxes passing through the first lens array 120, the second lens array 130 and the polarization converting element 140, to superpose the collected partial luminous fluxes on the vicinity of the image forming area of the liquid crystal devices 410R, 410G and 410B. In addition, the superposed lens 150 illustrated in FIG. 1 has one lens; however, the superposed lens 150 may have a compound lens that combines a plurality lenses in alternative implementation.

The color division light-guiding optical system 200 includes dichroic mirrors 210, 220, reflection mirrors 230, 240, 250, an incident side lens 260 and a relay lens 270. The color division light-guiding optical system 200 divides the luminous flux emitted from the superposed lens 150 into three color lights of a red light, a green light and a blue light, and guides the respective color lights to the three liquid crystal devices 410R, 410G and 410B that are to be illuminated.

The dichroic mirrors 210, 220 are optical elements where wavelength selection films are formed, wherein the wavelength selection films passes a luminous flux of a determined wavelength and reflects a luminous flux of other predetermined wavelength. The dichroic mirror 210 may reflect a red light component while other color light components penetrate therethrough. The dichroic mirror 220 may reflect a green light component while a blue light component penetrates therethrough.

The red light component reflected by the dichroic mirrors 210 is diffracted by the reflection mirror 230, and is incident on the imaging forming area of the liquid crystal device 400R for the red light through a light collecting lens 300R.

The light collecting lens 300R is used to convert each partial luminous flux received from the superposed lens 150 to a luminous flux that is approximately parallel to a respective principle light. The light collecting lens 300R is maintained by a maintaining member (not shown) that is thermal conductive, and is arranged in the case 10 through the thermal-conductive maintaining member. Light collecting lenses 300G and 300B that are arranged in a front end of an optical path of the liquid crystal devices 410G and 410B have substantially the same structure.

The green light component passing through the dichroic mirror 210 is reflected by the dichroic mirror 220, transmits the light collecting lens 300G and is incident on the imaging forming area of the liquid crystal device 410G for the green light. Meanwhile, the blue light component passing through the dichroic mirror 210 transmits the dichroic mirror 220, incident side lens 260, the reflection mirror 240 on the light-incident side, the relay lens 270, the reflection lens 250 on the light-emission side and the light collecting lens 300B and is incident on the image forming area of the liquid crystal device 410B for the blue light. The incident side lens 260, the relay lens 270 and the reflection mirrors 240 and 250 function to guide the blue light component passing through the dichroic mirror 220 to the liquid crystal device 410B.

In addition, since the blue light has an optical path that is longer than the other color lights, the incident side lens 260, the relay lens 270 and the reflection mirrors 240 and 250 are placed on an optical path of the blue light so as to prevent a lowering of the efficiency in using a light by, for example, light diversion. Thus, the projector 1000 in the first embodiment is configured considering the fact that the blue light has a longer optical path; however, the incident side lens 260, the relay lens 270 and the reflection mirrors 240 and 250 may be placed on an optical path of the red light in alternative implementation.

The liquid crystal devices 410R, 410G and 410B are used to modulate a luminous flux according to image information, and are an object of illumination of the lighting device 100.

The liquid crystal devices 410R, 410G and 410B have liquid crystal, that is an electro-optical substance, sealed by a pair of transparent glass substrates, to modulate a polarization direction of a straight polarization light of one kind emitted from the light-incident side polarization plates 420R, 420G and 420B based on a given image signal using a switching element, for example, a poly silicon TFT. Although the liquid crystal devices 410R, 410G and 410B are not illustrated in the figure, the liquid crystal devices 410R, 410G and 410B may be maintained in a maintaining frame that is a die-cast frame composed of aluminum.

The polarization plates 420R, 420G and 420B are respectively disposed on the light-incident side of the liquid crystal devices 410R, 410G and 410B as illustrated in FIGS. 2A and 2B. The light-incident side polarization plates 420R, 420G and 420B are used to transmit a straight polarization light having an axis in a predetermined direction among the lights emitted from the light collecting lenses 300R, 300G and 300B, and absorbs the other lights.

As illustrated in FIG. 3A, the light-incident side polarization plate 420R has a polarization layer 20 and a supporting layer 22 that supports the polarization plate 20. The light-incident side polarization plate 420R is adhered to a light-emission end surface of the light collecting lens 300R by an adhesive layer C where the supporting layer 22 is placed on the counterpart of the liquid crystal device 410R relative to the polarization layer 20, namely, close to the light collecting lens 300R. The polarization layer 20 may be, for example, a polarization layer where polyvinyl alcohol (PVA) is dyed by iodine or a dichroic dye and stretched in uniaxial direction so that a molecule of the dye may be arranged in one direction. Thus, the polarization layer produced in the above manner absorbs a light in a direction parallel to the uniaxial direction of stretching and transmits a light in a direction orthogonal to the uniaxial direction of stretching. Since a force is applied to the polarization layer 20 to return the polarization layer 20 that is stretched to an original state, the supporting layer 22 is used to control the force. The supporting layer 22 may comprise triacetyl cellulose (TAC) The light-incident side polarization plates 420G and 420B have substantially the same structure as with the light-incident side polarization plate 420R.

The light transmissive members 430R, 430G and 430B are arranged close to the liquid crystal devices, namely on the light-emission side of the polarization plates 420R, 420G and 420B. A reflection preventing layer (not shown) is formed on the light transmissive members 430R, 430G and 430B close to the liquid crystal devices. The light transmissive members 430R, 430G and 430B are light transmissive substrates comprising, for example, sapphire. Then the light transmissive substrate comprises sapphire, the light transmissive substrate has a higher thermal conductivity of about 40 W/((m·K), a higher degree of hardness, a lower thermal expansion coefficient, a higher degree of transparency, and is hard to crack. In addition, to lower the cost while achieving an average brightness, the light transmissive substrate comprising quartz having a thermal conductivity of about 10 W/(m·K) may be used. It is preferable that the light; transmissive members 430R, 430G and 430B have a thickness of more than 0.2 mm in consideration of the thermal conductivity, and have a thickness of less than 2.0 mm in consideration of manufacturing of a compact and small-sized device.

As illustrated in FIG. 3A, a light-incident end surface of the polarization plate 420R on the light-incident side is adhered to a light-emission end surface of the light collecting lens 300R through the adhesive layer C. In addition, a surface of light-emission side of the light-incident side polarization plate 420R is adhered to a surface of light-incident side of a second light transmissive member 430R through a gluing layer D. Accordingly, the reflection on an interface of each member may be reduced and light transmittance may be increased. In addition, even in a circumstance where the transmissive member 430R, the light-incident side polarization plate 420R and the light collecting lens 300R have different linear expansion coefficients, an exfoliation will not be easily occur on the respective jointing surface between the members so that a reliance in the long term may not be lowered. Also, the light-incident end surface of the light-incident side polarization plate 420R and the light-emission end surface of the light collecting lens 300R may be bonded to each other by a pressure sensitive adhesive, and a light-emission end surface of the light-incident side polarization plate 420R and a light-incident end surface of the light transmissive member 430R may be adhered to each other by an adhesive. The configuration of the periphery of the polarization plates 420G and 420B on the light-incident side is similar to that of the periphery of polarization plate 420R on the light-incident side.

The adhesive layer C is formed to surround the light-incident side polarization plates 420R, 420G and 420B. An adhesive for use as the adhesive layer C may be, for example, a UV curable adhesive or a visible ray short wavelength curable adhesive.

As illustrated in FIGS. 2A and 2B, the light-emission side polarization plates 440R, 440G and 440B are respectively arranged on light-emission sides of the respective liquid crystal devices 410R, 410G and 410B. The light-emission side polarization plates 440R, 440G and 440B transmit a straight light having an axis in a predetermined direction among the lights emitted from the liquid crystal devices 410R, 410G and 410B and absorb the other lights.

The light-emission side polarization plate 440R, as illustrated in FIG. 3B, has a polarization layer 40 and a supporting layer 42 that supports the polarization layer 40. The light-emission side polarization plate 440R is adhered to a light-incident end surface of the cross dichroic prism 500 through the adhesive layer C so that the supporting layer 42 is placed on the counterpart of the liquid crystal device 410R relative to the polarization layer 40, namely, close to the cross dichroic prism 500. The polarization layer 40 and the supporting layer 42 may have the same materials as that of the light-incident side polarization plate 420R. The light-emission side polarization plates 440G and 440B may have the same structure as the light-emission side polarization plate 440R, Light transmissive members 450R, 450G and 450B are respectively arranged on the light-emission side polarization plates 440R, 440G and 440B close to the liquid crystal devices. A reflection preventing layer (not shown) is formed on the light transmissive members 450R, 450G and 450B close to the liquid crystal devices. The light transmissive members 450R, 450G and 450B may be a light transmissive substrate comprising sapphire similar to the light transmissive members 430R, 430G and 430B.

As illustrated in FIG. 3B, a light-incident end surface of the light-emission side polarization plate 440R and a light-emission end surface of the light transmissive member 450R are adhered to each other through the adhesive layer C, and a light-emission end surface of the light-emission side polarization plate 440R and a light-incident end surface of the cross dichroic prism 500 are adhered to each other through the adhesive layer C. Accordingly, the reflection on a surface may be reduced and light transmittance may be increased. As a result, the brightness of a projection image may be improved. Also, in addition, even in a circumstance where the transmissive member 450R, the light-emission side polarization plate 440R and the cross dichroic prism 500 have different linear expansion coefficients, an exfoliation will not be easily occur on the respective jointing surface between the members so that a reliance in the long term may not be lowered. In addition, a pressure sensitive adhesive may be used instead of an adhesive. The configuration of the periphery of the polarization plates 440G and 440B on the light-emission side is similar to that of the periphery of polarization plate 440R on the light-emission side.

The adhesive layer C is formed to cover the light-emission side polarization plates 440R, 440G and 440B.

The polarization plates 420R, 420G and 420B on the light-incident side are set up and arranged in such a manner that a polarization axis of the polarization plates 420R, 420G and 420B on the light-incident side is orthogonal to that of- the polarization plates 440R, 440G and 440B on the light-emission side.

The cross dichroic prism 500 is an optical element that combines respective modulated optical image of each color light emitted from the polarization plates 440R, 440G and 440B on the light-emission side. As illustrated in FIG. 2A, the dichroic prism 500 has three light-incident end surfaces that receive respective color lights modulated by the liquid crystal devices 410R, 410G and 410B, and a light-emission end surface from which a combined color light emits. The four right-angle dichroic prisms 500 bonding together have a rectangular shape on a level, and a dielectric multi-layer film is formed on an interface between the dichroic prisms 500, which is shown as in a shape of a letter "X" in FIG. 2A. The dielectric multi-layer film formed on the "X" shaped interface is used to reflect a red light, while other dielectric multi-layer film formed on other interface is used to reflect a blue light. By the dielectric multi-layer film, the red color light and the blue light are diffracted and aligned in an advance direction of a green light so that the three color lights are combined.

The cross dichroic prism 500 is arranged in the case 10 through a spacer 12 having a thermal conductivity (refer to FIG. 2B).

A color image emitted from the cross dichroic prism 500 is enlarged and projected by the projecting optical system 600 to form a large screen image on the screen SCR.

In addition, although not illustrated in the figure, the projector 1000 may include at least one fan for cooling respective optical system and a plurality of flow paths for cooling air. An air coming into the projector 1000 from an outside circulate through the projector 1000 by the fan and the plurality of flow paths for cooling air and then discharged from the projector 1000. As illustrated in FIG. 2B, the air that flows to an air shaft (a flow path for cooling air) positioned within the case 10 is used to facilitate radiation of heat of the optical system 510.

Accordingly, heat may be efficiently removed from respective optical system of the projector 1000.

Next, a method for manufacturing an optical element according to the first embodiment will be described with reference to FIGS. 4 through 6.

Figure 4A:
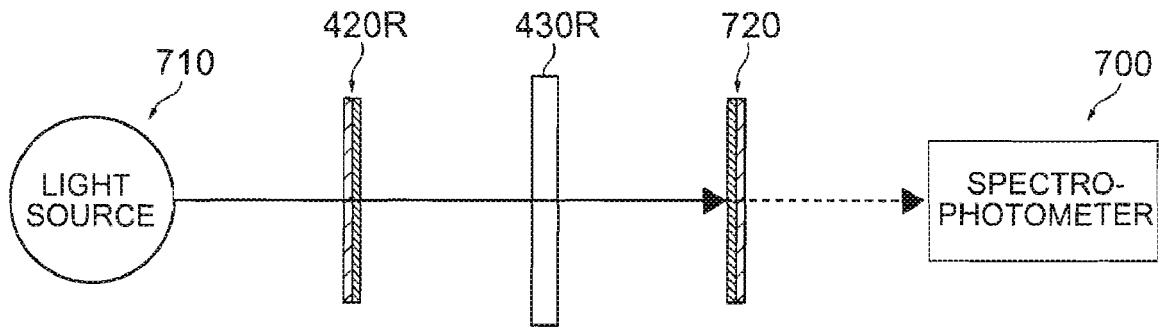
FIGS. 4A through 4D illustrate a method for manufacturing an optical element according to the first embodiment.
Figure 4B:
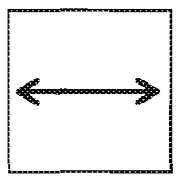
Figure 4B:
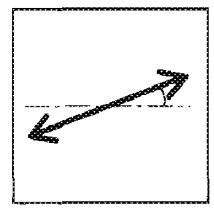
Figure 4B:
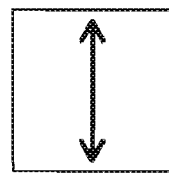
Figure 4C:
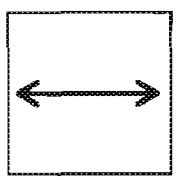
Figure 4C:
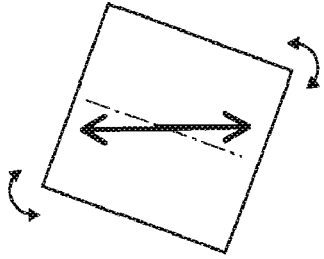
Figure 4C:
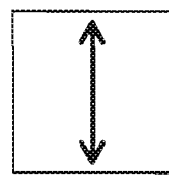
Figure 4D:
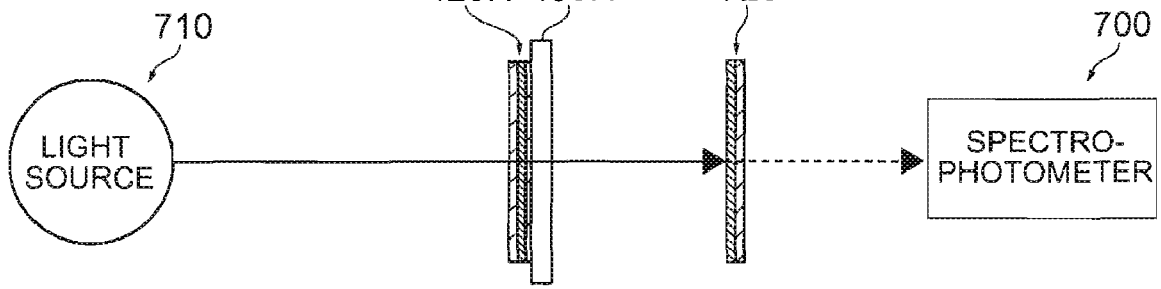

FIGS. 4A and 4B illustrate a method for manufacturing an optical element according to the first embodiment. FIGS. 4A and 4B illustrate an arranging in the process of manufacture of the optical element according to the first embodiment; FIG. 4C illustrates a measuring a light transmittance spectrum in the process of manufacture of the optical element according to the first embodiment; and FIG. 4D illustrates a bonding in the process of manufacture of the optical element according to the first embodiment. FIG. 5 is a flowchart diagram illustrating a method for manufacturing an optical element according to the first embodiment. FIG. 6 illustrates a light transmittance spectrum at respective rotational position of the light transmissive member 430R.

Figure 6:
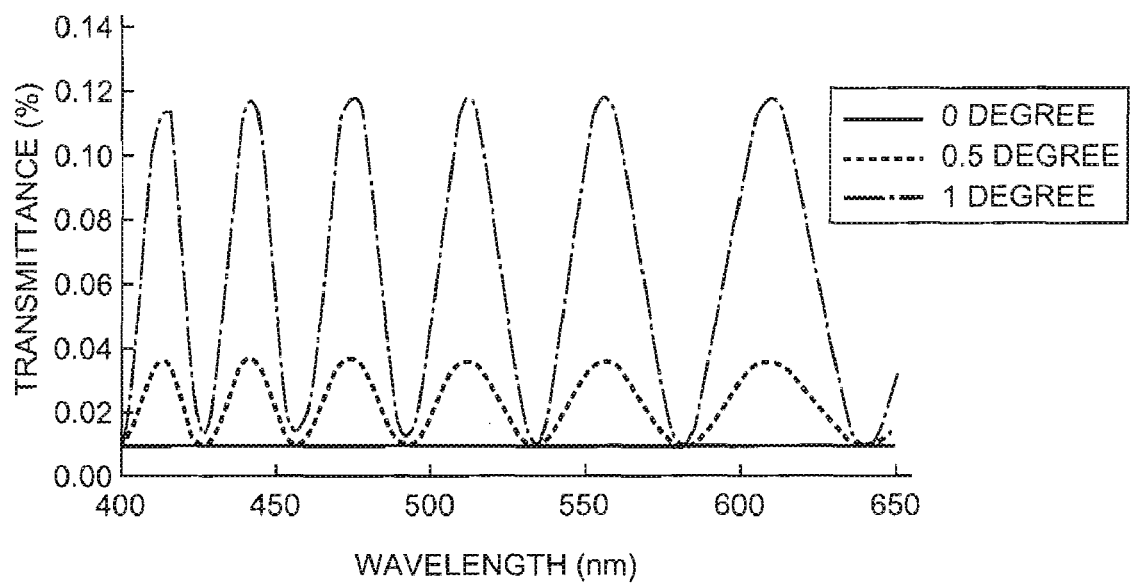
FIG. 6 illustrates a light transmittance spectrum relative to respective rotational position of a light transmissive member.

In addition, '0 degree' in the light transmittance spectrum of FIG. 6 indicates that an optical axis of the polarization plate 420R on the light-incident side is parallel to an optical axis of the light transmissive member 430R, '0.5 degree' in the light transmittance spectrum of FIG. 6 indicates that the optical axis of the polarization plate 420R on the light-incident side has a 0.5 degree deviation from the optical axis of the light transmissive member 430R, and '1 degree' in the light transmittance spectrum of FIG. 6 indicates that the optical axis of the polarization plate 420R on the light-incident side has a 1 degree deviation from the optical axis of the light transmissive member 430R.

The method for manufacturing the optical element according to the first embodiment is used to manufacture an optical element having a structure such that the polarization plates 420R, 420G and 420B on the light-incident side have the light transmissive members 430R, 430G, 430B respectively bonding to a first surface thereof and to manufacture an optical element having a structure such that the polarization plates 440R, 440G and 440B on the light-emission side have the light transmissive members 450R, 450G, 450B respectively bonding to a first surface thereof. In the method, '1. a preparing process', '2. an arranging process', '3. a light transmittance spectrum measuring process', '4. a rotational position determining process' and '5. a bonding process' are subsequently performed. Each of the process will be described below. For illustrative purposes, the optical element manufactured by the method has a structure such that the light transmissive member 430R is bonded to one side of the light-incident side polarization plate 420R.

1. Preparing Process

Figure 5:
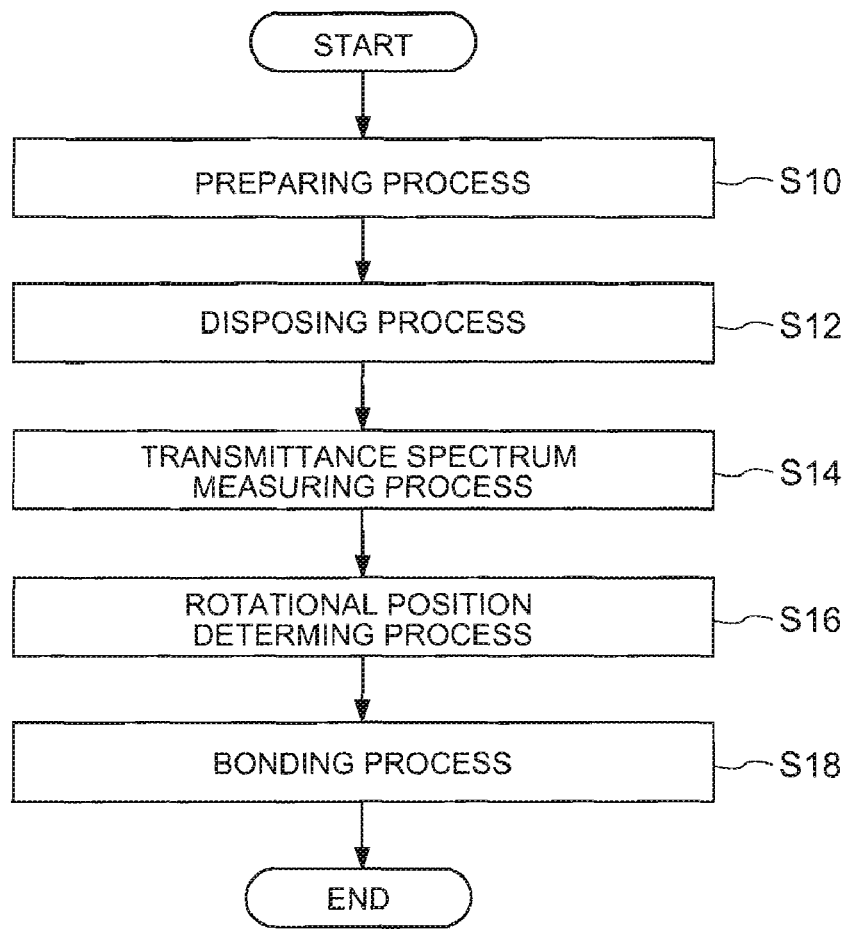
FIG. 5 is a flowchart diagram illustrating a method for manufacturing an optical element according to the first embodiment.

First, a light source 710, a polarization plate 420R on a light-incident side, a light transmissive member 430R, a certificating polarization plate 720 and a spectrophotometer 700 are prepared (step S10 in FIG. 5).

2. Arranging Process

As illustrated in FIG. 4A, the polarization plate 420R on the light-incident side, the light transmissive member 430R and the certificating polarization plate 720 are arranged between the light source 710 and the spectrophotometer 700 so that a light from the light source 710 is incident on the polarization plate 420R on the light-incident side, passes through the polarization plate 420R on the light-incident side, the light transmissive member 430R and the certificating polarization plate 720, and is incident on the spectrophotometer 700 (step S12 in FIG. 5). Here, as shown in FIG. 4B, the light transmissive member 430R is arranged between the polarization plate 420R on the light-incident side and the certificating polarization plate 720 so that the polarization plate 420R on the light-incident side and the certificating polarization plate 720 are in a crossed Nicols state.

3. Light Transmittance Spectrum Measuring Process

Next, the light transmissive member 430R is rotated relative to an axis that is parallel to a central axis of a light transmitting the light transmissive member 430R. With respect to each rotational position of the light transmissive member 430R, the light transmittance spectrum of the light within a predetermined wavelength that is incident on the spectrophotometer 700 is measured (step S14 in FIG. 5).

4. Rotation Position Determining Process

Next, based on a measured result of the light transmittance spectrum at each rotational position of the light transmissive member 430R in the '3. light transmittance spectrum determining process', the rotational position of the light transmissive member 430R is determined such that yields the smallest value for the difference between a minimum value and a maximum value of the light transmittance spectrum (step S16 of FIG. 5).

The detailed explanation of the '3. light transmittance spectrum measuring process' and '4. rotation position determining process' with reference to FIGS. 4 and 6 will be followed.

In a method for manufacturing an optical element according to the first embodiment, as illustrated in FIGS. 4A through 4D, the light-incident side polarization plate 420R and the certificating polarization plate 720 are disposed in a crossed Nicols state. Accordingly, if a light transmissive member 430R is not positioned on an optical path, only a straight polarized light parallel to a polarization axis of the light-incident side polarization plate 420R, among the lights emitted from the light source 710, is emitted from the light-incident side polarization plate 420R, and even the light passing through the light-incident side polarization plate 420R is absorbed in the certificating polarization plate 720. Thus, a light transmittance measured in the spectrophotometer 700 becomes almost 0% in all ranges of wavelength. However, in a method for manufacturing an optical element according to the first example, the light transmissive member 430R uses a transmissive substrate comprising sapphire so that, if the polarized light having a polarization axis which is not parallel or orthogonal to an optical axis of the light transmissive member 430R is incident on the light transmissive member 430R, the polarization state may be varied by a double refraction characteristic of sapphire.

In a method for manufacturing an optical element according to the first embodiment, when the optical axis of the light transmissive member 430R is parallel to the polarization axis of the light-incident side polarization plate 420R, the light transmittance spectrum of a lights which is emitted from the certificating polarization plate 720, measured in the spectrophotometer 700 is represented as a full line in FIG. 6. In addition, when the optical axis of a light transmissive member 430R is deviated from the polarization axis of the light-incident side polarization plate 420R by 0.5 degree, the light transmittance spectrum of a light, which is emitted from the certificating polarization plate 720, measured in the spectrophotometer 700 is represented as a dashed line in FIG. 6. Moreover, when the optical axis of a light transmissive member 430R is deviated from the polarization axis of the light-incident side polarization plate 420R by 1 degree, the light transmittance spectrum of a light, which is emitted from a certificating polarization plate 720, measured in the spectrophotometer 700 is represented as a dotted line in FIG. 6. As illustrated in FIG. 6, the more the optical axis of a light transmissive member 430R is deviated from the polarization axis of the light-incident side polarization plate 420R, the more increased the difference between a maximum value and a minimum value of the light transmittance with regard to a wavelength having a predetermined range becomes.

As described above, the light transmittance spectrums represented as a full line, a dashed line or a line with dot in FIG. 6 respectively indicate the cases where the optical axis of the light transmissive member 430R is parallel to the polarization axis of the light-incident side polarization plate 420R, the optical axis of the light transmissive member 430R is deviated by 0.5 degree from the polarization axis of the light-incident side polarization plate 420R, or the optical axis of the light transmissive member 430R is deviated by 1 degree from the polarization axis of the light-incident side polarization plate 420R. Meanwhile, the light transmittance spectrum in a case where the optical axis of the light transmissive member 430R is orthogonal to the polarization axis of the light-incident side polarization plate 420R is illustrated as a full line in FIG. 6. In addition, the light transmittance spectrum in a case where the optical axis of the light transmissive member 430R is deviated by 0.5 degree from a direction orthogonal to the polarization axis of the light-incident side polarization plate 420R is illustrated as a dashed line in FIG. 6. Moreover, the light transmittance spectrum in a case where the optical axis of the light transmissive member 430R is deviated by 1 degree from a direction orthogonal to the polarization axis of the light-incident side polarization plate 420R is illustrated as a dotted line in FIG. 6. Namely, the more the optical axis of the light transmissive member 430R is deviated from a direction orthogonal to the polarization axis of the light-incident side polarization plate 420R, the more increased the difference between a maximum value and a minimum value of the light transmittance with regard to a wavelength having a predetermined range becomes.

As described above, an angle between the optical axis of the light transmissive member 430R and a polarization axis of the light-incident side polarization plate 420R is closely related with the difference between the maximum value and the minimum value of the light transmittance with respect to a wavelength having a predetermined range. Thus, as illustrated in FIG. 4C, the light transmittance spectrum in each rotational position is measured while rotating the light transmissive member 430R in the '3. light transmittance spectrum measuring process'. Like this manner, in the '4. rotational position determining process', a rotational position of the light transmissive member 430R that yields a smallest value for the difference between the maximum value and the minimum value of the light transmittance is determined as an "optimal rotational position". That is, if the optical axis of the light transmissive member 430R is adjusted such that the difference between the maximum value and the minimum value of the light transmittance measured in the spectrophotometer 700 is reduced, the light-incident side polarization plate 420R and the light transmissive member 430R come to be disposed so as to minimize the varying degree of the polarization state of a light transmitting the light transmissive member 430R.

In addition, in a method for manufacturing an optical element according to the first embodiment, it is possible to adjust the optical axis of the light transmissive member 430R and the polarization axis of the light-incident side polarization plate 420R with precision level of equal to or less than 0.5 degree.

5. Bonding Process

In addition, as illustrated in FIG. 4D, the light-incident side polarization plate 420R and the light transmissive member 430R are bonded together at the rotational position of the light transmissive member 430R, determined in '4. rotational position determining process' (step S18 in FIG. 5).

As described above, an optical element having a structure such that the light transmissive member 430R is bonded to one side of the light-incident side polarization plate 420R may be manufactured. Like this manner, an optical element having a structure such that the light transmissive members 430G and 430B are respectively bonding to the light-incident side polarization plates 420G and 420B may be manufactured. Also, an optical element having a structure such that the light-transmissive members 440R, 440G and 440B are bonded to the light-incident side polarization plates 450R, 450G and 450B may be manufactured.

As described above, a manufacturing method of an optical element according to the first embodiment may be used to manufacture an optical element having a structure such that the light transmissive member is bonded to one side of the light-incident side polarization plate. In addition, it is also described above that a manufacturing method of an optical element according to the first embodiment includes a preparing process, an arranging process, a light transmittance spectrum measuring process, a rotational position determining process and a bonding process.

Consequently, according to a manufacturing method of an optical element related to the first embodiment, the light transmittance spectrum in each rotational position is measured while rotating the light transmissive member and, based on the measured light transmittance spectrum, a rotational position of the light transmissive member, which yields a smallest value for the difference between the maximum value and the minimum value of the light transmittance spectrum is determined. The polarization plate and the light transmissive member are bonded to each other at the determined rotational position of the light transmissive member. Therefore, it is possible to adjust a relative position between the polarization plate and the light transmissive member with high precision, in order that the polarization axis of the polarization layer of the polarization plate is parallel or orthogonal to the optical axis of the light transmissive member. Accordingly, the variation of the polarization state when a light transmits an optical element may be prevented or reduced. That is, the variation of the polarization state of a light that is emitted from the light-incident side polarization plate 420R, 420G, or 420B when transmitting the light transmissive member 430R, 430G, or 430B. In addition, the variation of the polarization state of a light that is emitted from the liquid crystal device 400R, 400G or 400B when transmitting the light transmissive member 450R, 450G, or 450B. As a result, the degradation of the display quality of the projection image may be prevented or reduced.

Therefore, according to a manufacturing method of an optical element of the first embodiment, an optical element which may improve the display quality of the projection image may be manufactured.

Next, a method for manufacturing a projector to the first embodiment will be described with reference to FIGS. 7 through 9.

Figure 7:
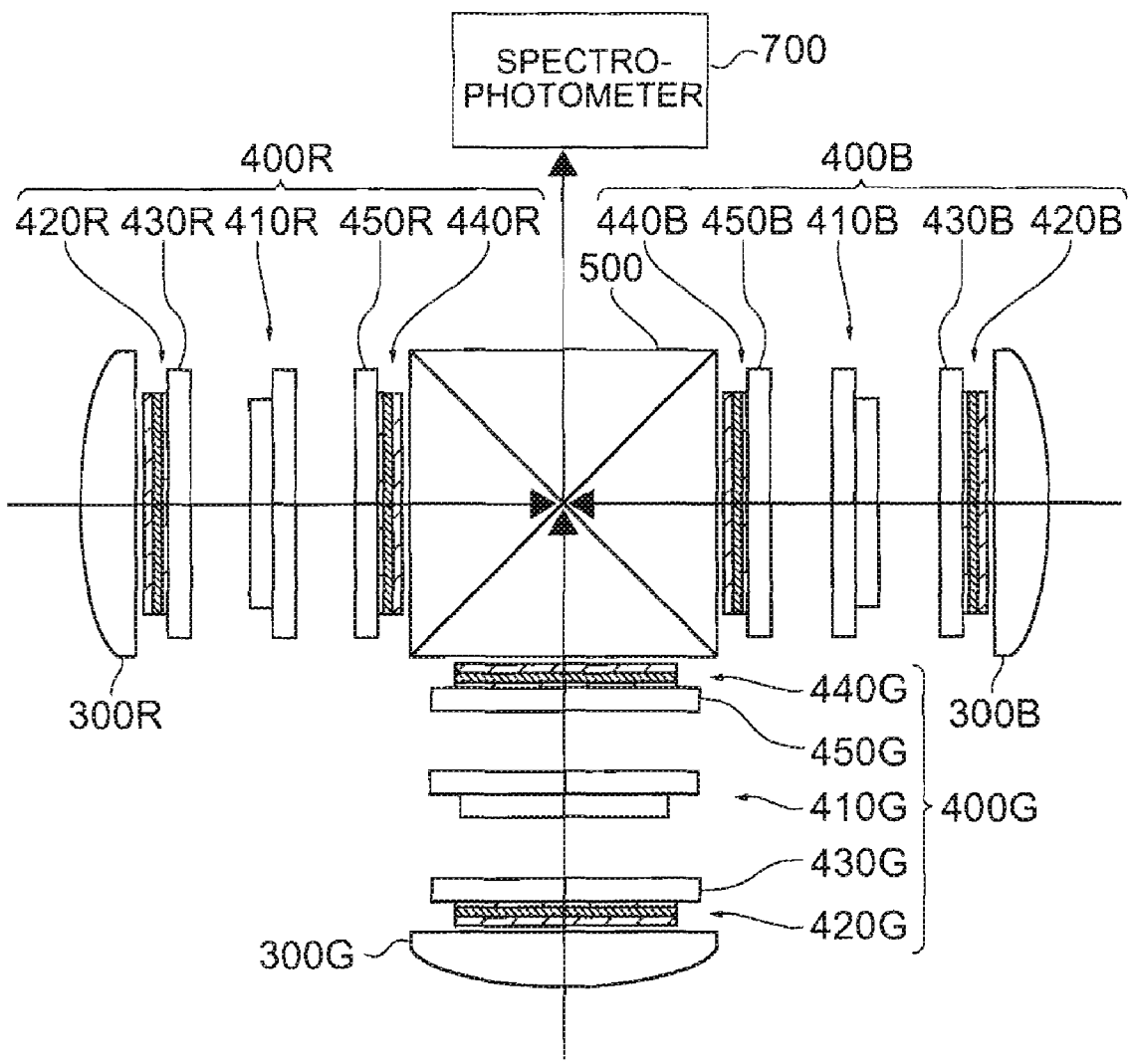
FIG. 7 illustrates a method for manufacturing an optical element according to the first embodiment.

FIG. 7 illustrates a method for manufacturing an optical element according to the first embodiment. FIG. 8 is a flowchart diagram illustrating a method for manufacturing an optical element according to the first embodiment. FIG. 9 is a flowchart diagram illustrating a process of arranging a polarization plate in the method for manufacturing an optical element according to the first embodiment.

The process of manufacture of the first embodiment is for purpose of manufacturing the projector 1, and in the method, '1. a process of arranging spectrophotometer' and '2. a process of arranging polarization plate' are subsequently performed. Each of the process is described below.

1. Process of Arranging Spectrophotometer

Figure 8:
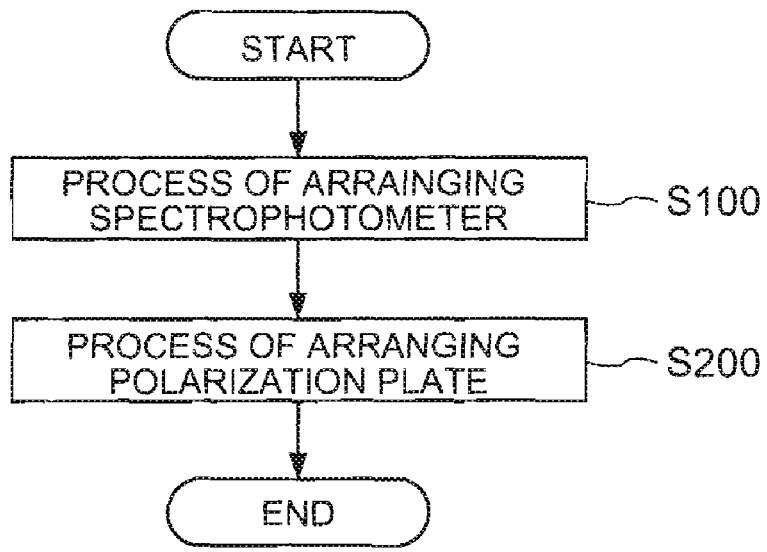
FIG. 8 is a flowchart diagram illustrating a method for manufacturing an optical element according to the first embodiment.

First, as shown in FIG. 7, the spectrophotometer 700 is arranged on a light-emission side of the cross dichroic prism 500 (step S100 in FIG. 8).

2. Process of Arranging Polarization Plate

Next, as shown in FIG. 7, the polarization plates 420R, 420G, 420B on the light-incident side and the polarization plates 440R, 440G, 440B are arranged respectively on the light-incident side and on the light-emission side of the liquid crystal devices 410R, 410G and 410B considering a proper polarization relationship (step S200 in FIG. 8).

In addition, the light transmissive members 430R, 430G, 430B, 450R, 450G, 450B are respectively adhered to the polarization plates 420R, 420G, 420B on the light-incident side and the side polarization plates 440R, 440G, 440B on the light-emission side by the method for manufacturing an optical element according to the first embodiment.

The '2. process of arranging polarization plate' includes '2-1. a first process', '2-2. a second process', '2-3. a third process' and '2-4. a fourth process'. The respective process is described below. For illustrative purposes, the description is made as regarding the polarization plate 420R on the light-incident side arranged on an optical path of the red light among the tree color lights, the liquid crystal device 410R and the polarization plate 440R on the light-emission side.

2-1. First Process

Figure 9:
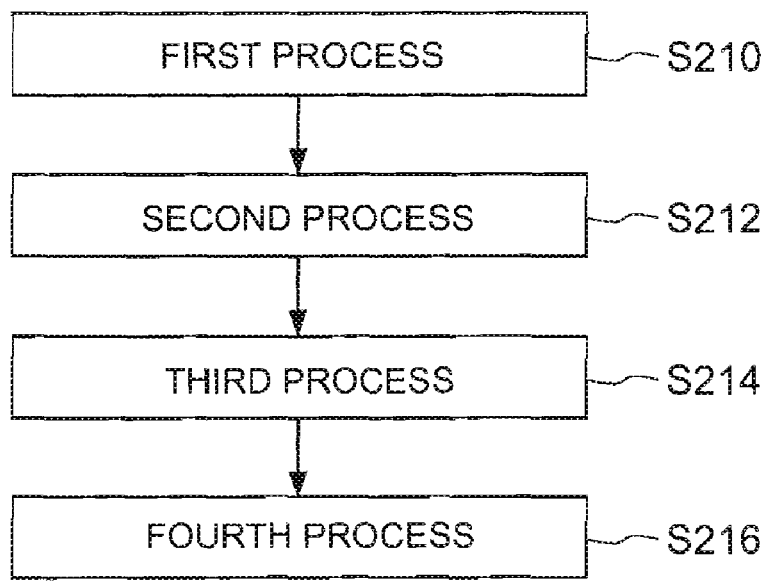
FIG. 9 is a flowchart diagram illustrating an arranging a polarization plate in the method for manufacturing an optical element according to the first embodiment.

The light-incident side polarization plate 420R, the liquid crystal device 410R and the light-emission side polarization plate 440R are disposed between the light source device 110 and the spectrophotometer 700 in an order such that a light emitted from the light source device 110 passes through the light-incident side polarization plate 420R, the liquid crystal device 410R and the light-emission side polarization plate 440R, and is incident on the spectrophotometer 700 (step S210 in FIG. 9). Herein, the light-incident side polarization plate 420R and the light-emission side polarization plate 440R are disposed such that the light-incident side polarization plate 420R and the light-emission side polarization plate 440R are in a crossed Nicols state.

2-2. Second Process

Next, at least one of the polarization plate 420R on the light-incident side or the polarization plate 440R on the light-emission side is rotated relative to an axis that is parallel to a central axis of a light transmitting the liquid crystal device 410R to vary an angle between an optical axis of the polarization plate 420R on the light-incident side and the polarization plate 440R on the light-emission side. With respect to each rotational position thereof, the light transmittance spectrum of a light within a predetermined wavelength that is incident on the spectrophotometer 700 is measured (step S212 in FIG. 9).

In addition, in a method for manufacturing an optical element according to the first embodiment, it is possible to adjust the optical axis of the light-incident side polarization plate 420R and the polarization axis of the light-emission side polarization plate 440R with precision level of equal to or less than 0.5 degree.

2-3. Third Process

Next, based on the light transmittance spectrum measured in '2-2. second process' with respect to respective rotational position of the polarization plate 420R on light-incident side and the polarization plate 440R on the light-emission side, a relative rotational position of the polarization plate 420R on the light-incident side and the polarization plate 440R on the light-emission side is determined such that yields the smallest value for the difference between a minimum value and a maximum value of the light transmittance spectrum (S214 in FIG. 9).

2-4. Fourth Process

In addition, positions of the light-incident side polarization plate 420R and the light-emission side polarization plate 440R are fixed in order to maintain the relative rotational position of the light-incident side polarization plate 420R and the light-emission side polarization plate 440R determined in '2-3. third process' (step S216 in FIG. 9).

Moreover, in a manufacturing method of a projector according to the first embodiment, the rotational position of the light-incident side polarization plate 420R is fixed by bonding the light-incident side polarization plate 420R to the light-emission side of the light collecting lens 300R, and the rotational position of a light-emission side polarization plate 440R is fixed by bonding the light-emission side polarization plate 440R to the light-incident section of red light of the cross dichroic prism 500.

The '2-1. a first process' through '2-4. a fourth process' are performed regarding the light-incident side polarization plate 420R and the light-emission side polarization plate 440R disposed in an optical path of a red light. Like this manner, the '2-1. a first process' through '2-4. a fourth process' are performed regarding the light-incident side polarization plate 420G and the light-emission side polarization plate 440G disposed in an optical path of a green light. Also, the '2-1. a first process' through '2-4. a fourth process' are performed regarding the light-incident side polarization plate 420B and the light-emission side polarization plate 440B disposed in an optical path of a blue light.

In this manner, the projector 1000 according to the first embodiment of the present invention may be manufactured.

As described above, the method for manufacturing the projector according to the first embodiment of the present invention includes a process of arranging a polarization plate such that the polarization plates 420R, 420G and 420B on the light-incident side and the polarization plates 440R, 440G and 440B on the light-emission side are respectively arranged on the light-incident side and the light-emission side of the liquid crystal devices 410R, 410G and 410B considering polarization direction thereof. Also, the method includes a process of arranging the spectrophotometer that is performed prior to the process of arranging the polarization plate. As described above, the process of arranging the polarization plate includes a first process, a second process, a third process and a fourth process.

According to the method for manufacturing the projector of the first embodiment, either the polarization plates 420R, 420G and 420B on the light-incident side or the polarization plates 440R, 440G, 440B on the light-emission side, or both are rotated and a light transmittance spectrum is measured on respective rotational position thereof. Based on the measured light transmittance spectrum, a relative rotational postion of the respective polarization plates 420R, 420G and 420B on the light-incident side and the polarization plates 440R, 440G, 440B on the light-emission side are determined such that yields the smallest value for the difference between a minimum value and a maximum value of the light transmittance spectrum. The polarization plates 420R, 420G and 420B on the light-incident side and the polarization plates 440R, 440G and 440B on the light-emission side are bonded at the determined relative rotational position so that it is prevented that a light that is to pass through the polarization plate on the light-emission side is absorbed by the polarization plate, or a light that is to be absorbed by the polarization plate on the light-emission side passes through the polarization plate. In addition, lowering in contrast of a projection image, an uneven brightness, or an uneven color may be prevented or reduced. As a result, the deterioration of display quality of a projection image may be prevented or reduced.

Thus, according to the method for manufacturing a project of the first embodiment, it is possible to manufacture a projector having improved display quality of a projection image.

In addition the projector 1000 that is manufactured according to the method of the first embodiment described above may improve display quality of a projection image.

Second Embodiment

Figure 10A:
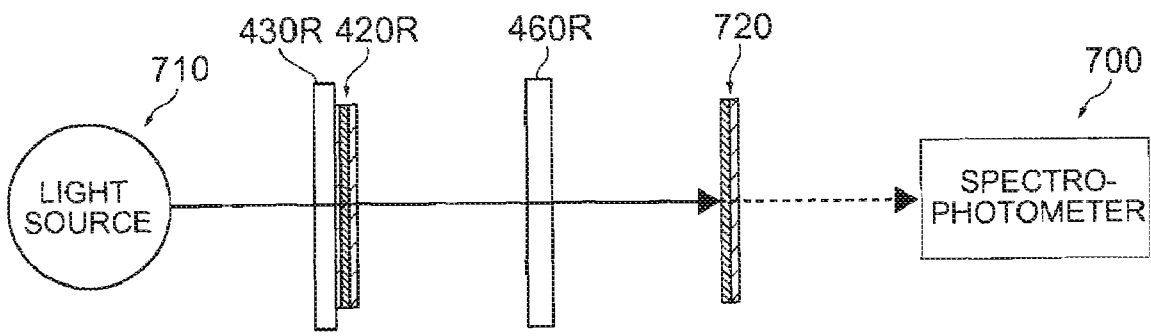
FIGS. 10A to through 10D illustrate a method for manufacturing an optical element according to a second embodiment.
Figure 10B:
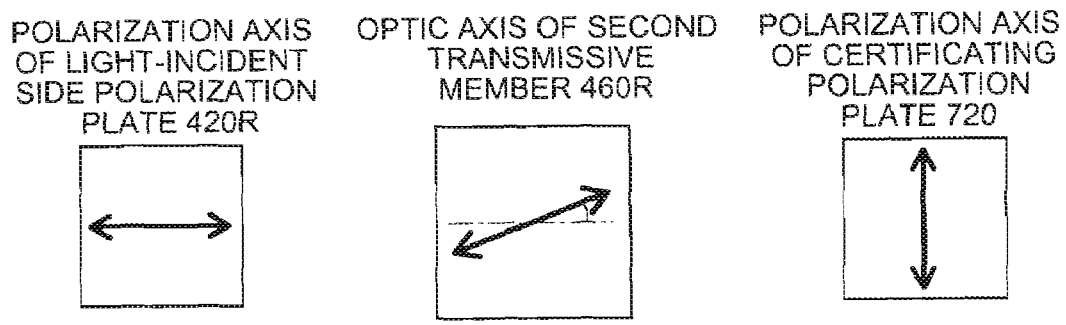
Figure 10C:
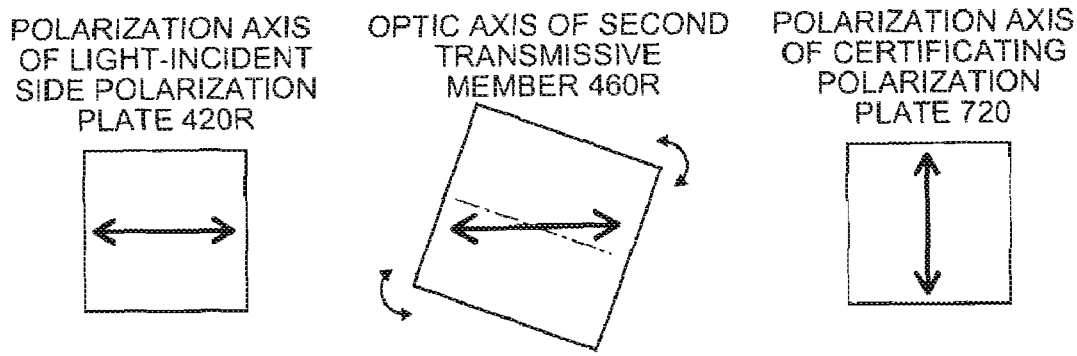
Figure 10D:
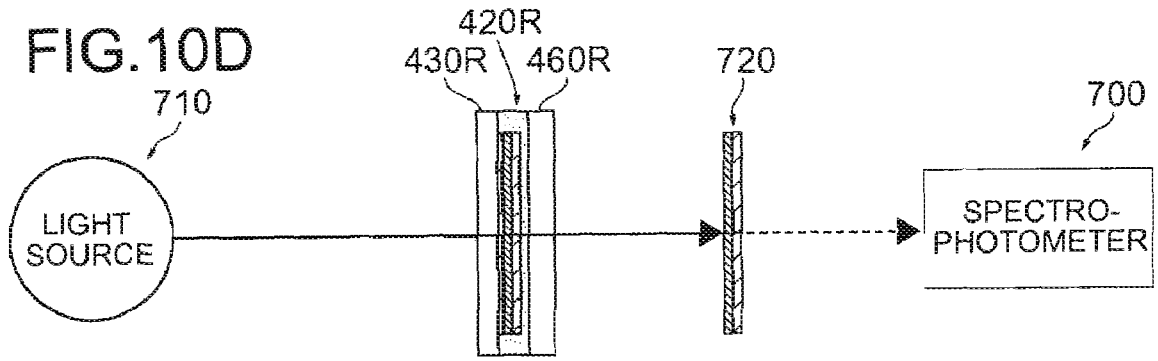
Figure 11:
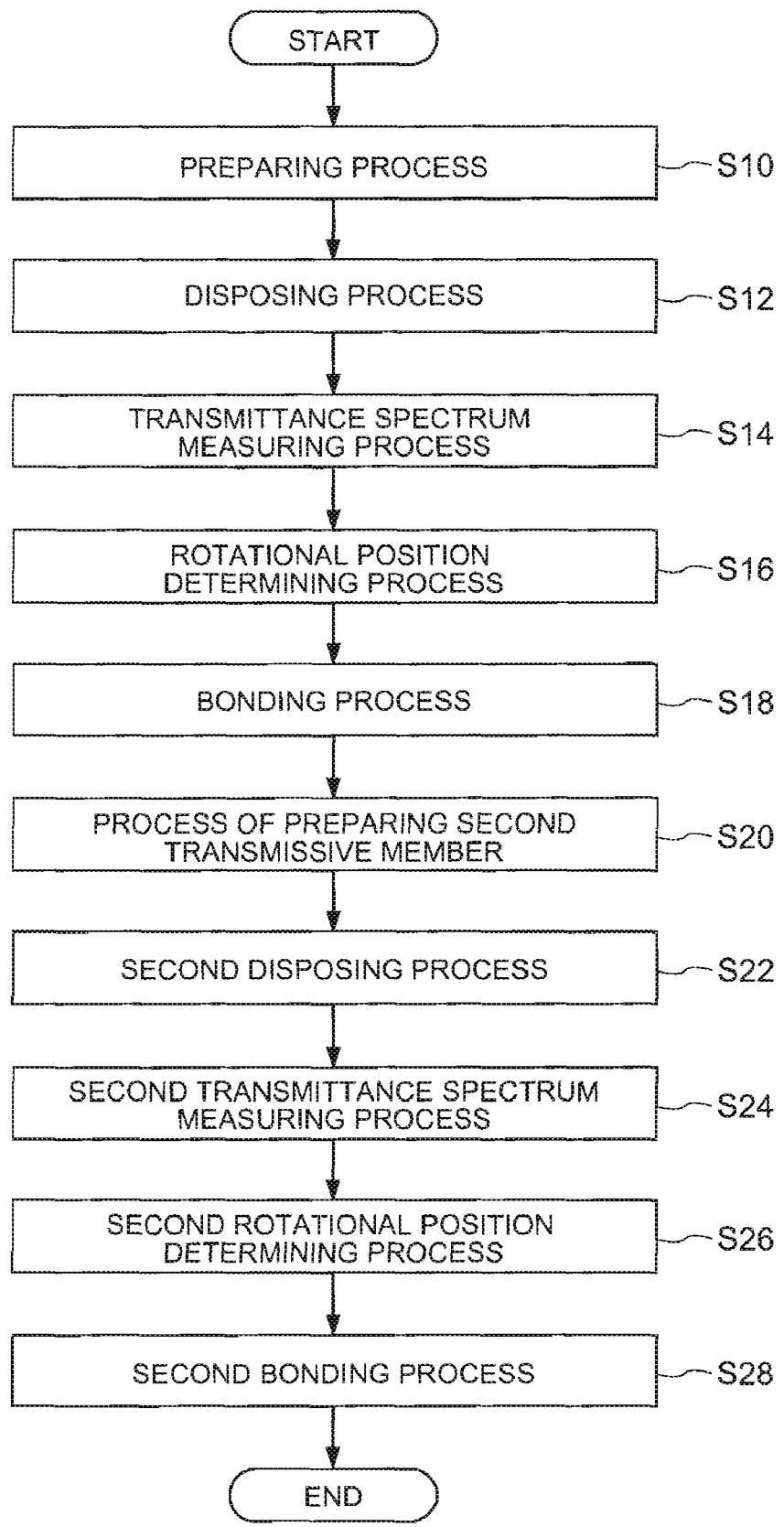
FIG. 11 illustrates a method for manufacturing an optical element according to the second embodiment.

FIGS. 10A through 10D illustrate a method for manufacturing an optical element according to a second embodiment. FIGS. 10A and 10B illustrate a second arranging in the method for manufacturing the optical element according to the second embodiment. FIG. 10C illustrates a second measuring of a light transmittance spectrum in the method for manufacturing the optical element according to the second embodiment. FIG. 10D illustrates a second bonding in the method for manufacturing the optical element according to the second embodiment. FIG. 11 illustrates a method for manufacturing an optical element according to the second embodiment.

The method for manufacturing the optical element according to the second embodiment is used to manufacture an optical element having a structure (not illustrated in the figure) such that the polarization plates 420R, 420G and 420B on the light-incident side have the light transmissive members 430R, 430G, 430B respectively bonding to a first surface thereof, and second light transmissive members 460R, 460G and 460B respectively bonding to a surface opposing to the first surface, i.e., a second surface thereof. In addition, the method is used to manufacture an optical element having a structure (not illustrated in the figure) such that the polarization plates 440R, 440G and 440B on the light-emission side have the light transmissive members 450R, 450G, 450B respectively bonding to a first surface thereof, and the second light transmissive members 470R, 470G and 470B bonding to a second surface thereof.

In the method according to the second embodiment, as shown, in FIG. 11, '1. a preparing process', '2. an arranging process', '3. a light transmittance spectrum measuring process', '4. a rotational position determining process', '5. a bonding process', '6. a process of preparing the second light transmissive member', '7. a second arranging process', '8. a second light transmittance spectrum measuring process', '9. a second rotational position determining process', and '10. a second bonding process', are subsequently performed.

Each of the process will be described below, however, '1. a preparing process' through '5. a bonding process' are substantially the same or similar to those described in the first embodiment, and thus any further explanation will be omitted. Also, for illustrative purposes, the optical element manufactured by the method has a structure such that the light transmissive member 430R is bonded to a first surface of the polarization plate 420R on the light-incident side and the second light transmissive member 460R is bonded to a second surface of the polarization plate 420R on the light-incident sides 6. Process of Preparing the Second Light Transmissive Member The second light transmissive member 460R is prepared (Step S20 in FIG. 11). The second light transmissive member 460R is, for example, a light transmissive substrate comprising sapphire. The light transmissive substrate comprising sapphire has a higher thermal conductivity of about 40 W/((m·K), a very high degree of hardness, a lower thermal expansion coefficient, a higher degree of transparency and is hard to crack. In addition, to lower the cost while achieving an average brightness, the light transmissive substrate comprising quartz having a thermal conductivity of about 10 W/(m·K) may be used. It is preferable that the light transmissive members 460R have a thickness of more than 0.2 mm in consideration of the thermal conductivity, and have a thickness of less than 2.0 mm in consideration of manufacturing of a compact and small-sized device.

In addition, the light source 710 and the second light transmissive member 460R may be prepared together in the '1. a preparing process'. In this circumstance, '6. a process of preparing the second light transmissive member' is omitted.

7. Second Arranging Process

The polarization plate 420R on the light-incident side, the second light transmissive member 460R and the certificating polarization plate 720 are arranged between the light source 710 and the spectrophotometer 700 so that a light from the light source 710 is incident on the polarization plate 420R on the light-incident side, passes through the polarization plate 420R on the light-incident side, the second light transmissive member 460R and the certificating polarization plate 720 and is incident on the spectrophotometer 700 (step S22 in FIG. 11). Here, the polarization plate 420R on the light-incident side is arranged such that it is disposed on the side of the second light transmissive member 460R. Also, as shown in FIG. 10B, the second light transmissive member 460R is arranged between the polarization plate 420R on the light-incident side and the certificating polarization plate 720 so that the polarization plate 420R on the light-incident side and the certificating polarization plate 720 are in a crossed Nicols state.

8. Second Light Transmittance Spectrum Measuring Process

Next, as shown in FIG. 10C, the second light transmissive member 460R is rotated relative to an axis that is parallel to a central axis of a light transmitting the second light transmissive member 460R. With respect to each rotational position of the second light transmissive member 460R, the light transmittance spectrum of the light within a predetermined wavelength that is incident on the spectrophotometer 700 is measured (step S24 in FIG. 11).

In addition, in the method for manufacturing the optical element according to the second embodiment, a polarization axis of the polarization plate 420R on the light-incident side and a polarization axis of the second light transmissive member 460R may be adjusted with a precision level equal to or less than 0.5 degree.

9. Second Process of Determining of Rotational Position

Next, based on the measured result of the light transmittance spectrum of the second light transmissive member 460R on respective rotational position in the '8. Second process of measuring a light transmittance spectrum', the rotational position of the second light transmissive member 460R is determined such that yields the smallest value for the difference between a minimum value and a maximum value of the light transmittance spectrum (step S26 in FIG. 11).

10. Second Process of Bonding

As illustrated in FIG. 10D, in the rotational position of the second light transmissive member 460R that is decided in the '9. Second process of determining rotational position', the polarization plate 420R on the light-incident side is bonded to the second light transmissive member 460R (S28 in FIG. 11).

As described above, it is manufactured an optical element having a structure such that the light transmissive member 430R is bonded to a first surface of the polarization plate 420R on the light-incident side, and the second light transmissive member 460R is bonded to a second surface of the polarization plate 420R. In addition, using the above described processes, it is manufactured an optical element having a structure such that the polarization plates 420G and 420B on the light-incident side have the light transmissive members 430G and 430B respectively bonding to a first surface thereof, and the second light transmissive members 460G and 460B bonding to a second surface thereof, and it also is manufactured an optical element having a structure such that the polarization plates 440R, 440G and 440B on the light-emission side have the light transmissive members 450R, 450G and 450B respectively bonding to a first surface thereof and the second light transmissive members 470R, 470G and 470B bonding to a second surface thereof.

Thus, the method for manufacturing an optical element according to the second embodiment is used to manufacture an optical element having a structure such that the polarization plate has a light transmissive member bonded to a first surface thereof and a second light transmissive member bonded to a second surface thereof. As described above, the method according to the second embodiment includes a preparing process, a arranging process, a light transmittance spectrum measuring process, a rotational position determining process, a bonding process, a second process of preparing a second light transmissive member, a second arranging process, a second light transmittance spectrum measuring process, a second rotational position determining process and a second bonding process.

Thus, according to a method for manufacturing the optical element of the second embodiment, when the polarization plate that is bonded to the light transmissive member is also bonded to the second light transmissive member, as in the case of the first embodiment where the polarization plate is bonded to the light transmissive member, the second light transmissive member is rotated and the light transmittance spectrum of the light is measured with respect to each rotational position. Based on the measured result of the light transmittance spectrum with respect to each rotational position, the rotational position of the second light transmissive member is determined such that yields the smallest value for the difference between a minimum value and a maximum value of the light transmittance spectrum. The polarization plate and the second light transmissive member are bonded at the determined relative rotational position so that the polarization axis of the polarization plate may be adjusted to be parallel to or orthogonal to the optical axis of the second light transmissive member with higher precision. Accordingly, the variation of the polarization state of a light when transmitting the optical element may be prevented or reduced. As a result, the degradation of display quality of a projection image may be prevented or reduced.

Therefore, according to a method for manufacturing an optical element of the second embodiment, it is possible to manufacture an optical element having an improved display quality of projection image.

Herein, a method for manufacturing an optical element, a method for manufacturing a projector and a projector is illustrated in the above described embodiments; however, the present invention is not limited to the above embodiments but may be implemented in various alternative embodiments without departing from the spirit and scope of the invention. For example, the following variations of the invention are possible.

(1) Although the optical element of the embodiment of the present invention is described in connection with the application to a projector, however, it is not to be construed as limitations of the present invention. The optical element according to the embodiment of the present invention may be applied to other optical equipment that uses a polarization light such as a polarization microscope or an optical disk device.

(2) In the embodiments, the light transmissive member or the second light transmissive member uses a light transmissive substrate comprising sapphire, however, a light transmissive substrate comprising quartz may also be utilized.

(3) In the '2. arranging process' of the first embodiment, as illustrated in FIG. 4A, the polarization plate 420R on the light-incident side, the light transmissive member 430R and the certificating polarization plate 720 are arranged between the light source 710 and the spectrophotometer 700 so that a light from the light source 710 is incident on the polarization plate 420R on the light-incident side, passes through the polarization plate 420R on the light-incident side, the light transmissive member 430R and the certificating polarization plate 720 and is incident on the spectrophotometer 700. However, this is not to be understood as limitations of the present invention and in an alternative embodiment, the certificating polarization plate 720, the light transmissive member 430R and the polarization plate 420R on the light-incident side are arranged between the light source 710 and the spectrophotometer 700 In the order named from the light source 710 so that a light from the light source 710 is incident on the certificating polarization plate 720, passes through the certificating polarization plate 720, the light transmissive member 430R and the polarization plate 420R and is incident on the spectrophotometer 700.

(4) In the '7. second arranging process' of the second embodiment, as illustrated in FIG. 10A, the polarization plate 420R on the light-incident side where the transmissive member 430R is adhered, the second light transmissive member 460R and the certificating polarization plate 720 are arranged between the light source 710 and the spectrophotometer 700 so that a light from the light source 710 is incident on the light transmissive member 430R, passes through the light transmissive member 430R, the polarization plate 420R on the light-incident side, the second light transmissive member 460R and the certificating polarization plate 720 and is incident on the spectrophotometer 700. However, this is not to be understood as limitations of the present invention and in an alternative embodiment, the certificating polarization plate 720, the second light transmissive member 460R and the polarization plate 420R on the light-incident side where the transmissive member 430R is adhered are arranged between the light source 710 and the spectrophotometer 700 in the order named from the light source 710 so that a light from the light source 710 is incident on the certificating polarization plate 720 to transmit the certificating polarization plate 720, the second light transmissive member 460R, the polarization plate 420R on the light-incident side and the light transmissive member 430R and is incident the spectrophotometer 700.

(5) In the projector 1000 of the first embodiment, the polarization plate 420R on the light-incident side is interposed between the light collecting lens 300R and the light transmissive member 430R to adhere thereto. However, this is not construed as limitations of the present invention, and in an alternative implementation, or example, the light collecting lens 300R and the polarization plate 420R on the light-incident side are separated, or the polarization plate 420R on the light-incident side is interposed between the light transmissive member 430R and the second light transmissive member 460R to adhere thereto.

(6) In the protector 1000 of the first embodiment, the polarization plate 440R on the light-emission side is interposed between the cross dichroic prism 500 and the light transmissive member 430R to adhere thereto. However, this is not construed as limitations of the present invention, and in an alternative implementation, for example, the polarization plate 420R on the light-emission side and the cross dichroic prism 500 are separated, or the polarization plate 440R on the light-emission side is interposed between the light transmissive member 450R and the second light transmissive member 460R to adhere thereto.

(7) In the embodiment of the present invention, the polarization plate on the light-incident side or the polarization plate on the light-emission side has a two-layer structure where a supporting layer is laminated on the polarization layer. However, this may not be construed as limitations of the present invention, and the polarization plate may have a three-layer structure where the supporting layer is laminated on both sides of the polarization layer, or may have a single-layer structure.

(8) In the projector 1000 according to the first embodiment, the light source device 110 having the ellipsoid reflector 114, the light emitting tube 112 of which luminance center is near a first focus of the ellipsoid reflector 114 and the concave lens 118 is used. However, this is not construed as limitations of the present invention, and in an alternative implementation, a light source having a parabolic reflector and a light emitting tube of which luminance center is near a focus of the parabolic reflector may be used.

(9) In the projector 1000 according to the first embodiment, the subsidiary mirror 116 is arranged in the light emitting tube 112 to serve as reflection means. However, this is not to be construed as limitations of the present invention, and the light emitting tube 112 may not include the subsidiary mirror 116.

(10) In the projector 1000 according to the first embodiment, a lens integrator optical system, light-uniforming optical system, having a lens array is utilized, however, this is not to be construed as limitations of the present invention and a load integrator optical system having a load member may be preferably utilized.

(11) According to the above described embodiments, the projector has three liquid crystal devices 410R, 410G and 410B. However, this is not to be construed as limitations of the present invention, and the projector may include two or more than four liquid crystal devices.

(12) The present invention can be applied to a front type projector that projects an image from an observer side, and also be applied to a rear type projector that projects an image from an opposite side of the observer side.

The entire disclosure of Japanese Patent Application NO. 2006-049738, filed Feb. 27, 2006 is expressly incorporated by reference herein.

What is claimed is:

1. A method for manufacturing an optical element including a light transmissive member made of a material having an optical axis and a polarization plate having a polarization layer, the light transmissive member being bonded to a first surface of the polarization plate, the method comprising:

preparing a light source, the polarization plate, the light transmissive member, a certificating polarization plate and a spectrophotometer;

arranging the light transmissive member between the polarization plate and the certificating polarization plate so that the to polarization plate and the certificating polarization plate are in a crossed Nicols state, and the polarization plate, the light transmissive member and the certificating polarization plate are arranged between the light source and the spectrophotometer in an order such that a light from the light source is incident on the polarization plate, passes through the polarization plate, the light transmissive member and the certificating polarization plate, and is incident on the spectrophotometer, or in an order such that a light from the light source is incident on the certificating polarization plate, passes through the certificating polarization plate, the light transmissive member and the polarization plate, and is incident on the spectrophotometer;

measuring a light transmittance spectrum with respect to each rotational position of the light transmissive member within a predetermined wavelength that is incident on the spectrophotometer while the light transmissive member is rotated relative to an axis that is parallel to a central axis of a light transmitting the light transmissive member;

determining a rotational position of the light transmissive member based on a measured result of the light transmittance spectrum measured in the measuring of the light transmittance spectrum such that yields a smallest value for a difference between a minimum value and a maximum value of the light transmittance spectrum; and bonding the light transmissive member to the polarization plate at the rotational position of the light transmissive member that is determined in the determining of the rotational position.

2. The method for manufacturing an optical element according to claim 1, wherein the optical element includes a second light transmissive member bonded to a second surface opposing to the first surface of the polarization plate where the light transmissive member is bonded, the method further comprising:

preparing the second light transmissive member;

second arranging the second light transmissive member between the polarization plate and the certificating polarization plate so that the to polarization plate and the certificating polarization plate are in a crossed Nicols state, and the polarization plate, the second light transmissive member and the certificating polarization plate are arranged between the light source and the spectrophotometer in an order such that a light from the light source is incident on the polarization plate, passes through the polarization plate, the second light transmissive member and the certificating polarization plate, and is incident on the spectrophotometer, or in an order such that a light from the light source is incident on the certificating polarization plate, passes through the certificating polarization plate, the second light transmissive member and the polarization plate, and is incident on the spectrophotometer;

second measuring a light transmittance spectrum with respect to each rotational position of the second light transmissive member within a predetermined wavelength of light incident on the spectrophotometer while the second light transmissive member is rotated relative to an axis that is parallel to a central axis of a light transmitting the second light transmissive member;

second determining a rotational position of the second light transmissive member based on a measured result of the light transmittance spectrum measured in the second measuring of the light transmittance spectrum such that yields a smallest value for a difference between a minimum value and a maximum value of the second light transmittance spectrum; and second bonding the second light transmissive member to the polarization plate at the rotational position of the second light transmissive member that is determined in the second determining of the rotational position.

3. A method for manufacturing a projector including a light source device that emits a luminous flux, a liquid crystal device that modulates the luminous flux emitted from the light source according to image information, a protecting optical, system that projects a light modulated by the liquid crystal device, an incident side polarization plate having at least polarization layer, arranged on a light-incident side of the liquid crystal device and an emission side polarization plate having at least polarization layer, arranged on a light-emission side of the liquid crystal device, the method comprising:

arranging a spectrophotometer on the light-emission side of the liquid crystal device, arranging the liquid crystal device between the incident side polarization plate and the emission side polarization so that the incident side polarization plate and the emission side polarization plate are in a crossed Nicols state, and the incident side polarization plate, the liquid crystal device and the emission side polarization plate are disposed in an order such that a light emitted from the light source passes through the incident side polarization plate, the liquid crystal device and the emission side polarization plate and is incident on the spectrophotometer;

measuring a light transmittance spectrum with respect to each rotational position where at least one of the incident side polarization plate and the emission side polarization plate is rotated relative to an axis parallel to a central axis of a light transmitting the liquid crystal device to vary an angle between a polarization axis of the incident side polarization plate and a polarization axis of the emission side polarization plate, the light transmittance spectrum is a light transmittance spectrum of a light, that is incident on the spectrophotometer in a predetermined wavelength at respective rotational position;

determining a relative rotational position for the incident side polarization plate and the emission side polarization plate based on a measured result of the light transmittance spectrum at respective rotational position, the relative rotational positions providing a smallest value for a difference between a maximum value and a minimum value of the light transmittance spectrum; and fixing the incident side polarization plate and the emission side polarization plate to maintain the relative rotational position for the incident side polarization plate and the emission side polarization plate.

4. An optical element manufactured using the method according to claim 1.

5. An optical element manufactured using the method according to claim 2.

6. A projector manufactured using the method according to claim 3.

* * * * *